(12) United States Patent
Marupaduga et al.

(10) Patent No.: US 9,019,987 B1
(45) Date of Patent: Apr. 28, 2015

(54) SYSTEM AND METHOD FOR AVOIDING THE TRANSMISSION OF UNSUPPORTED MESSAGES

(71) Applicant: Sprint Spectrum L.P., Overland Park, KS (US)

(72) Inventors: Sreekar Marupaduga, Overland Park, KS (US); Nicholas Kullman, Kansas City, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 165 days.

(21) Appl. No.: 13/796,826

(22) Filed: Mar. 12, 2013

(51) Int. Cl.
*H04W 72/04* (2009.01)
*H04W 88/06* (2009.01)

(52) U.S. Cl.
CPC .......... *H04W 72/0406* (2013.01); *H04W 88/06* (2013.01)

(58) Field of Classification Search
None
See application file for complete search history.

(56) References Cited

U.S. PATENT DOCUMENTS

| 8,265,281 | B2 | 9/2012 | Wang et al. |
| 8,768,305 | B1* | 7/2014 | Singh et al. ................... 455/411 |
| 2009/0036134 | A1 | 2/2009 | Ryu et al. |
| 2013/0183974 | A1* | 7/2013 | Johansson et al. ............ 455/436 |
| 2013/0231086 | A1* | 9/2013 | Naik et al. ..................... 455/411 |

FOREIGN PATENT DOCUMENTS

WO 2012017087 2/2012

* cited by examiner

*Primary Examiner* — Kerri Rose

(57) ABSTRACT

Disclosed herein are methods and systems to provide, to a wireless communication device (WCD), a mapping between a first unsupported message type and a first supported message type. One embodiment takes the form of a method that involves a base station transmitting in a coverage area, for receipt by a given WCD configured to send a first unsupported message type to the base station, a mapping that correlates the first unsupported message type with the first supported message type. As a result of transmitting the mapping, the base station receives, from the given WCD, a message of the first supported message type in the place of a message of the first unsupported message type.

20 Claims, 4 Drawing Sheets

SYSTEM AND METHOD FOR AVOIDING THE TRANSMISSION OF UNSUPPORTED MESSAGES

BACKGROUND

Unless otherwise indicated herein, the materials described in this section are not prior art to the claims and are not admitted to be prior art by inclusion in this section.

A typical wireless carrier network includes a number of base stations that radiate to define wireless coverage areas, such as cells and cell sectors, in which wireless coverage devices (WCDs) such as cell phones, tablet computers, tracking devices, embedded wireless modules, mobile hotspots, and other wirelessly-equipped communication devices, can operate. Each base station may be coupled with equipment that provides connectivity with one or more transport networks such as the public switched telephone network (PSTN) and/or the Internet for instance. With this arrangement, a WCD operating in a coverage area of the wireless carrier network may engage in air interface communication, via the wireless carrier network, with other WCDs operating in the wireless carrier network as well as with various remote network entities sitting outside of the wireless carrier network.

The wireless carrier network may operate in accordance with a particular air interface protocol or "radio access technology," with communications from the base stations to WCDs defining a downlink (or forward link) and communications from the WCDs to the base stations defining an uplink (or reverse link). Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. The architecture of the wireless carrier network may vary depending on the protocol employed.

During interaction between WCDs and a wireless carrier network, various types of messages may be exchanged These message types may take various forms, which may depend on factors such as the air interface protocol employed and the operating state of the WCD. For instance, after a given WCD operating in an idle state enters a coverage area of the wireless carrier network, the given WCD may send control messages such as a registration message and/or a message identifying the location of the WCD to the wireless carrier network. Thereafter, the given WCD may send control messages to facilitate the establishment of an active connection with the wireless carrier network, such as an access probe, a page response message, a channel assignment request, etc. If the WCD does transition into an active state and establish an active connection with the wireless carrier network, the WCD may then exchange other types of control messages (as well as bearer data) with the wireless carrier network, such as control messages to facilitate a handover. Finally, when the active connection between the given WCD and the wireless carrier network is to be terminated (e.g., because the exchange of bearer data is complete or due to a radio link failure), the given WCD may exchange control messages with the wireless carrier network related to that termination. It should be understood that these and other messages are described merely for purposes of illustration, and that a WCD may be configured to send various other types of messages to a wireless carrier network as well.

SUMMARY

As air interface protocols advance, WCDs may become capable of sending a wider range of control message types to a wireless carrier network. However, some entities in the wireless network, such as base stations manufactured by certain original equipment manufacturers (OEMs), may not be configured to support this entire range of message types. In this situation, such an entity may be unable to process certain unsupported message types sent by WCDs—which may result in various negative consequences. For instance, if a given WCD sends a message type that is unsupported by a given base station, the given WCD, the given base station, and perhaps one or more other network entities may be required to exchange additional messages to try to accomplish the same purpose that would otherwise be accomplished by the unsupported message type—which may increase the amount of air-interface resources consumed (e.g., control channel occupancy) and the time needed to accomplish that purpose.

For example, after receiving an unsupported message type from the given WCD, the given base station may be configured to send to the given WCD a "reject" message indicating that a recently-sent message type is unsupported. In such instances, the given WCD may respond to the "reject" message by sending one or more additional messages of a different type to accomplish the same purpose served by the unsupported message type—which may require the given base station (and perhaps one or more other network entities) to send additional messages as well.

In another example, after receiving an unsupported message type from the given WCD, the given base station may not be configured to send to the given WCD a message indicating that a recently-sent message type is unsupported. In such instances, the given WCD may then be configured to resend the unsupported message type for a period of time before ultimately stopping and sending one or more messages of a different type, which may or may not be supported. And as noted above, the given WCD's transmission of the different message type(s) may also require the given base station (and perhaps one or more other network entities) to send additional messages.

In either of the above examples, the message of the unsupported type may also be a message that is necessary to maintain a resource that has been established to serve a communication between the given WCD and the wireless carrier network, like a radio link and/or traffic channel. In such instances, the given base station's inability to process the message of the unsupported type could ultimately lead to the loss of that established resource, and thus require the given WCD and the wireless carrier network to essentially "start over" with the control messaging required to re-establish the resource. As a result, the communication between the given WCD and wireless carrier network may be interrupted and the amount of air-interface resources consumed may be significantly increased.

One representative example of this issue exists for certain LTE base stations, which are not configured to support a radio resource control (RRC) connection reestablishment request message that is sent by a WCD when it detects that a radio link begins to fail. When one of these LTE base stations receives a RRC connection reestablishment request message, the base station will not be able to process it, the radio link between the WCD and the LTE network may be lost, and additional control messages may then need to be exchanged between the WCD, the LTE base station, and one or more other entities in the LTE network in order to reestablish the radio link.

For example, after receiving the RRC connection establishment message, an LTE base station may send to the WCD a reject message indicating that the RRC connection reestablishment request message is unsupported. Additionally, the given LTE base station may also send to a mobility management entity (MME) in the LTE network a context release request message that requests the release of the WCD's connection. In response, the MME may send a context release command to the LTE base station, and the LTE base station may respond with a context release complete message indicating that the connection has been released. The LTE base station may also send the WCD a RRC connection release message. Once the WCD receives the RRC connection release message, the WCD may then attempt to connect using a different type of message that the LTE base station does support, such as a RRC connection request message that is used to initiate a new active connection with the LTE network—which may trigger the exchange of even more control messaging between the WCD, the LTE base station, and the MME.

Disclosed herein are methods that are intended to help avoid the negative consequences caused by the transmission of unsupported message types. According to embodiments of the disclosed methods, a given base station may be configured to send, for receipt by one or more WCDs located in the given base station's coverage area(s), a mapping that correlates at least one unsupported message type to at least one supported message type. In turn, a given WCD located in the given base station's coverage area(s) and configured to send the at least one unsupported message type may receive the mapping. Thereafter, the given WCD may use the mapping to send the at least one supported message type in the place of the at least one unsupported message type. As a result, the given base station may thus receive the at least one supported message type from the given WCD in the place of the at least one unsupported message type. This may reduce the chances of the given base station receiving unsupported messages from WCDs in the given base station's coverage area(s)—which may in turn reduce the amount of additional control messages exchanged and/or the amount of additional time it takes to carry out the action triggered by the unsupported message types.

In one embodiment, the disclosed methods may include (a) a base station transmitting in a coverage area, for receipt by a given WCD configured to send a first unsupported message type to the base station, a mapping that correlates the first unsupported message type with a first supported message type; and (b) as a result of transmitting the mapping, the base station receiving, from the given WCD, a message of the first supported message type in the place of a message of the first unsupported message type.

The feature of the base station transmitting the mapping may take various forms, examples of which include (i) broadcasting the mapping for receipt by WCDs in the coverage area of the base station, (ii) multicasting the mapping to a group of WCDs in the coverage area of the base station, or (iii) unicasting the mapping to the given WCD. The transmission of the mapping may be according to a schedule or responsive to a triggering event, such as an indication that the given WCD is trying to connect to the base station. Other examples may also exist.

The first unsupported and first supported message types may also take various forms. As one possible example, in the LTE protocol, the first unsupported message type may be a RRC connection reestablishment request message type, and the first supported message type may be a RRC connection request message type. Other examples may also exist.

In another embodiment, the disclosed methods may include (a) a WCD receiving, from a base station, a mapping that correlates a first unsupported message type with a first supported message type; (b) based on the mapping, the WCD deciding to send a message of the first supported type in the place of a message of the first unsupported type; and (c) the WCD sending to the base station the message of the first supported type.

The feature of the WCD deciding to send the message of the first supported type in the place of the message of the first unsupported type based on the mapping may take various forms. In one example, this feature may include (i) based on the mapping, transitioning to a mode in which the WCD is configured to respond to a given event by sending the message of the first supported message type in the place of the message of the first unsupported message type, and then (ii) detecting the given event. In another example, this feature may include (i) detecting a given event for which the WCD is configured to respond by sending a message of a given message type, and (ii) based on the mapping, determining that the given message type is the first unsupported message type and responsively selecting the first supported message type to send in the place of the given message type.

Also disclosed herein are structures configured to facilitate implementation of the disclosed methods. One embodiment may take the form of a base station that includes a communication interface, a processor, data storage, and program instructions executable by the processor for carrying out the functions described herein.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION

The present systems and methods will now be described with reference to the figures. It should be understood, however, that this and other arrangements described herein are set forth as examples only. As such, those skilled in the art will appreciate that other arrangements and elements (e.g., machines, interfaces, functions, orders of functions, etc.) can be used instead. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions described herein may be carried out by a processor executing instructions written in any suitable programming language and stored in memory.

Figure 1:
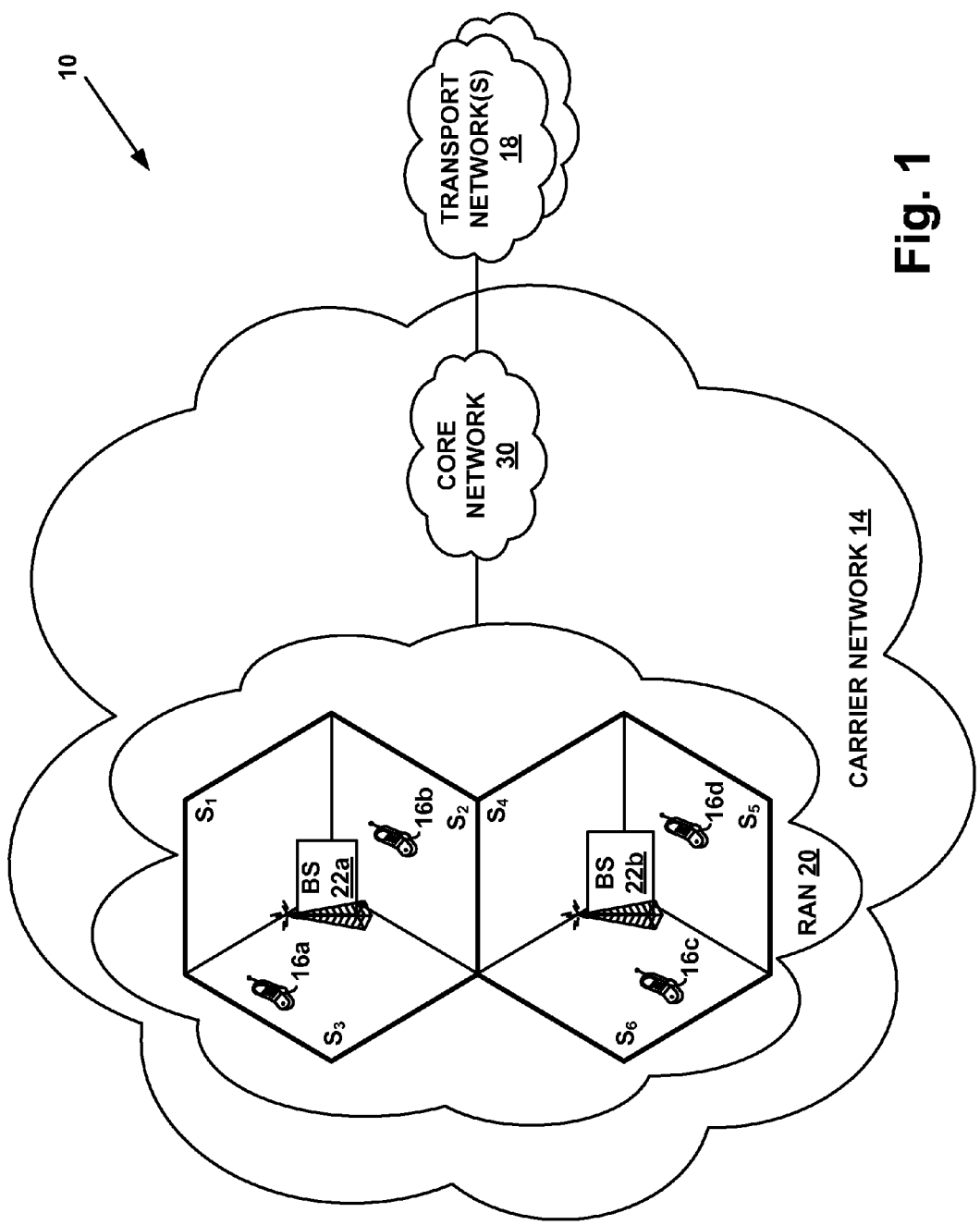
FIG. 1 is a simplified block diagram of an example communication system in which embodiments of the disclosed methods and entities can be implemented.

Referring to the drawings, FIG. 1 is a simplified block diagram of an example communication system 10 in which embodiments of the disclosed methods and entities can be implemented. FIG. 1 depicts example system 10 as including a representative wireless carrier network 14 that facilitates communication with wireless communication devices (WCDs), such as WCDs 16a-d, and provides connectivity with one or more transport networks (e.g., the public switched telephone network (PSTN) and/or the Internet), such as transport network 18. As shown, wireless carrier network 14 may take the form of one or more radio access networks (RANs), such as an example RAN 20, each of which is communicatively coupled to a core network 30. Other arrangements are possible as well.

RAN 20 may include one or more base stations (e.g., base stations, access nodes, node-Bs, eNodeBs, etc.), each of which includes an antenna arrangement and associated equipment that radiates to define one or more coverage areas (e.g., a cell and/or cell sectors) in which WCDs can operate and engage in wireless communication with RAN 20 over an air interface. For example, FIG. 1 shows RAN 20 as including at least a first base station 22a that radiates to define sectors $S_1$-$S_3$ and a second base station 22b that radiates to define sectors $S_4$-$S_6$. It should be understood, however, that the depicted arrangement of base stations and coverage areas is for purposes of illustration only, and that numerous other arrangements of base stations and coverage areas are possible as well.

As noted above, in practice, base stations 22a-b and WCDs 16a-d may be arranged to communicate with each other according to an agreed air-interface protocol (such as one of those noted above) that defines a downlink for carrying communications from a respective base station to WCDs and an uplink for carrying communications from WCDs to the respective base station. The agreed air-interface protocol may also employ techniques such time-division multiplexing, frequency-division multiplexing, and/or code-division multiplexing to divide the air interface into a plurality of channels.

As one representative example, in the LTE protocol, the agreed air-interface protocol may include a user plane protocol stack and a control plane protocol stack to organize data carried between a respective base station and WCDs. The user plane protocol stack may include a Packet Data Convergence Protocol (PDCP), a Radio Link Control (RLC), and a Medium Access Control (MAC) that allow data to be carried through an access stratus. The control plane protocol may also include a PDCP, a RLC, and a MAC layer, as well as a Radio Resource Control (RRC) protocol layer that helps to control and support connections between one or more WCDs, RAN 20, and a radio access bearer. Other protocol layers are also available.

Data may be communicated between layers in the protocol stacks using logical channels and transport channels. Logical channels may be defined based on whether the channel carries control data (e.g., including but not limited to the control messages described above) or bearer data between the RLC layer and the MAC layer. Examples of logical channels that carry control data may include a Broadcast Control Channel (BCCH), a Multicast Control Channel (MCCH), a Paging Control Channel (PCCH), a Common Control Channel (CCCH), and a Dedicated Control Channel (DCCH). Examples of logical channels that carry bearer data may include a Dedicated Traffic Channel (DTCH) and a Multicast Traffic Channel (MTCH). Additional logical channels are also possible.

The logical channels may then map to one or more transport channels, which may carry data between the MAC layer and physical channels. Transport channels may also define channel coding schemes, modulation schemes, and antenna mapping. Generally, transport channels may include downlink transport channels and uplink transport channels. Example downlink transport channels may include a Downlink Shared Channel (DL-SCH), a Broadcast Channel (BCH), a Multicast Channel (MCH), and a Paging Channel (PCH), and example uplink transport channels may include an Uplink Shared Channel (UL-SCH) and a Random Access Channel (RACH). Other transport channels are also possible. Based on a typical mapping between the logical and transport channels, the DL-SCH, the MCH, and the UL-SCH may carry both control and bearer data, while the other transport channels may carry control data only. However, other configurations are also possible.

The transport channels may in turn map to one or more physical channels, which may be used to exchange data between a respective base station and WCDs. Physical channels also generally include both downlink channels and uplink channels. Example downlink channels may include a Physical Broadcast Channel (PBCH), a Physical Control Format Indicator Channel (PCFICH), a Physical Downlink Control Channel (PDCCH), a Physical Hybrid-ARQ Indicator Channel (PHICH), a Physical Downlink Shared Channel (PDSCH), and a Physical Multicast Channel (PMCH), and example uplink channels may include a Physical Uplink Control Channel (PUCCH), a Physical Uplink Shared Channel (PUSCH), and a Physical Random Access Channel (PRACH). Other downlink and uplink channels are also possible. Based on a typical mapping between the transport and physical channels, the PDSCH, the PMCH, and the PUSCH may carry both control and bearer data, while the other transport channels may carry control data only. However, other configurations are also possible.

Core network 30 may include network infrastructure (not shown) that provides connectivity between RAN 20 and transport network 18 and may also help to control aspects of RAN 20 and one or more base stations. Depending on the radio access technology employed, this network infrastructure may take various forms. For example, if wireless carrier network 14 is operating in accordance with an LTE protocol, core network 30 may include entities such as a mobility management entity (MME), a serving gateway (SGW), a packet data network gateway (PGW), and/or a home subscriber server (HSS). As another example, if wireless carrier network 14 is operating in accordance with a CDMA protocol, core network 30 may include entities such as a mobile switching center (MSC), a packet data serving node (PDSN), a home location register (HLR), and/or a visitor location register (VLR). The core network's infrastructure may take various other forms as well. (It should also be understood that at least some of these entities might be considered to be part of a network other than core network 30, such as RAN 20.)

It should be understood, however, that this depicted arrangement of the wireless carrier network 14 is for purposes of illustration only, and that numerous other arrangements of coverage areas are possible as well—including arrangements that include other networks and/or entities that are not shown. As one possible example, RAN 20 may further include one or more controllers that may provide connectivity to core network 30 and may also help to control aspects of the RAN's one or more base stations, such as aspects of antenna-system operation and/or air-interface communication. In one implementation, for instance, RAN 20 may include a separate controller (e.g., a base station controller (BSC) or radio network controller (RNC)) that sits between one or more base station 22a-b and core network 30. In another implementation, one or more base stations 22a-b may include an integrated controller. Other arrangements are possible as well, including arrangements in which at least a portion of the controller resides in core network 30. In another possible example, wireless carrier network 14 may include a location system arranged to help determine the locations of WCDs operating in wireless carrier network 12. Various other examples are possible as well.

Representative WCDs 16a-d may each be any device capable of engaging in air-interface communication with wireless carrier network 14 according to an agreed air-interface protocol (such as one of those noted above). WCDs 16a-d may thus take various forms, examples of which include a cellular telephone, a tablet or other wirelessly-equipped computer, a personal digital assistant (PDA), a personal navigation device (PND), and/or a mobile hotspot. Other examples are possible as well.

Figure 2:
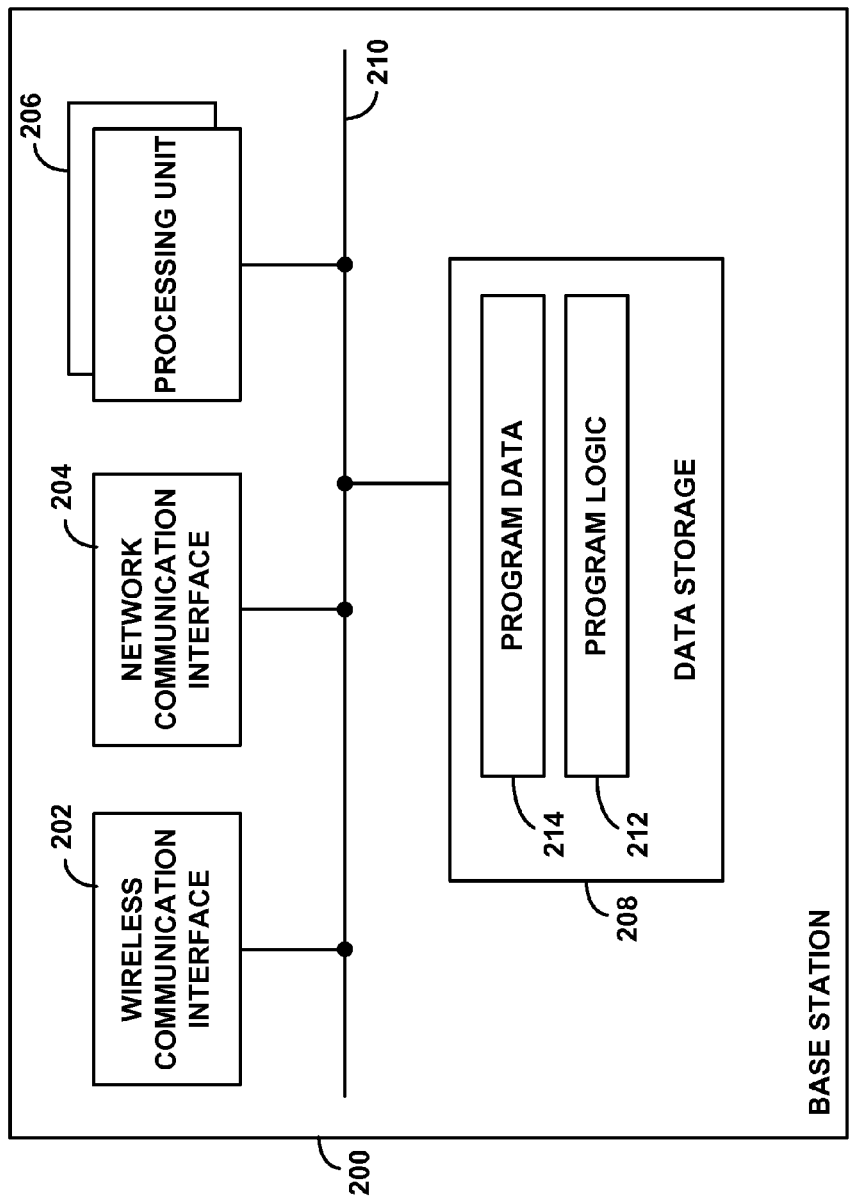
FIG. 2 is a simplified block diagram showing functional components that may be included in a base station to facilitate implementation of the methods described herein.

FIG. 2 is a simplified block diagram showing functional components that may be included in an example base station 200 to facilitate implementation of methods described elsewhere herein. Example base station 200 may be representative of base stations 22a-b depicted in FIG. 1, although these base stations can take other forms as well.

As shown, example base station 200 may include a wireless communication interface 202, a network communication interface 204, a processing unit 206, and data storage 208, all of which may be communicatively linked together by a system bus, network, or one or more other connection mechanisms 210. Example base station 200 may also include other components that are not shown. It should also be understood that the configuration and/or functionality of example base station 200 may be distributed and/or subdivided between a plurality of entities, such as multiple base stations. Further, it should be understood that some of the functions described herein may be carried out by an entity other than base station 200.

Wireless communication interface 202 generally functions to radiate to define one or more coverage areas in which WCDs can operate and engage in wireless communication with base station 200 over an air interface. As such, wireless communication interface 202 may include one or more antenna structures arranged in various ways (e.g., one or more directional or sectored antennas that are potentially tower mounted). Additionally, wireless communication interface 202 may include other associated components, such as a power amplifier and/or a modem for instance. Other configurations are also possible.

Network communication interface 204 generally serves to connect base station 200 to wireless carrier network 14 (e.g., via a controller and/or some other entity). Network communication interface 204 may take any suitable form to serve this purpose, examples of which include an Ethernet interface, a serial bus interface (e.g., FireWire, USB 2.0, etc.), a chipset and antenna adapted to facilitate wireless communication, and/or any other interface that provides for wired and/or wireless communication. Network communication interface 204 may also include multiple interfaces. Other configurations are possible as well. Processing unit 206 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 206 may be integrated in whole or in part with other components of example base station 200.

Data storage 208 may comprise one or more non-transitory computer readable mediums. For example, data storage 208 may take the form of one or more volatile and/or non-volatile storage components, such as magnetic, optical, or organic storage components, which may be integrated in whole or in part with other components of example base station 200.

As further shown, data storage 208 may be arranged to include program logic 212 and/or program data 214. Program logic 212 may comprise machine language instructions or the like that may be executable or interpretable by processing unit 206 to carry out various functions, including the functionality described herein. In turn, program data 214 may include one or more types of data that is usable by processing unit 206 to carry out various functions, including the functionality described herein.

Figure 3:
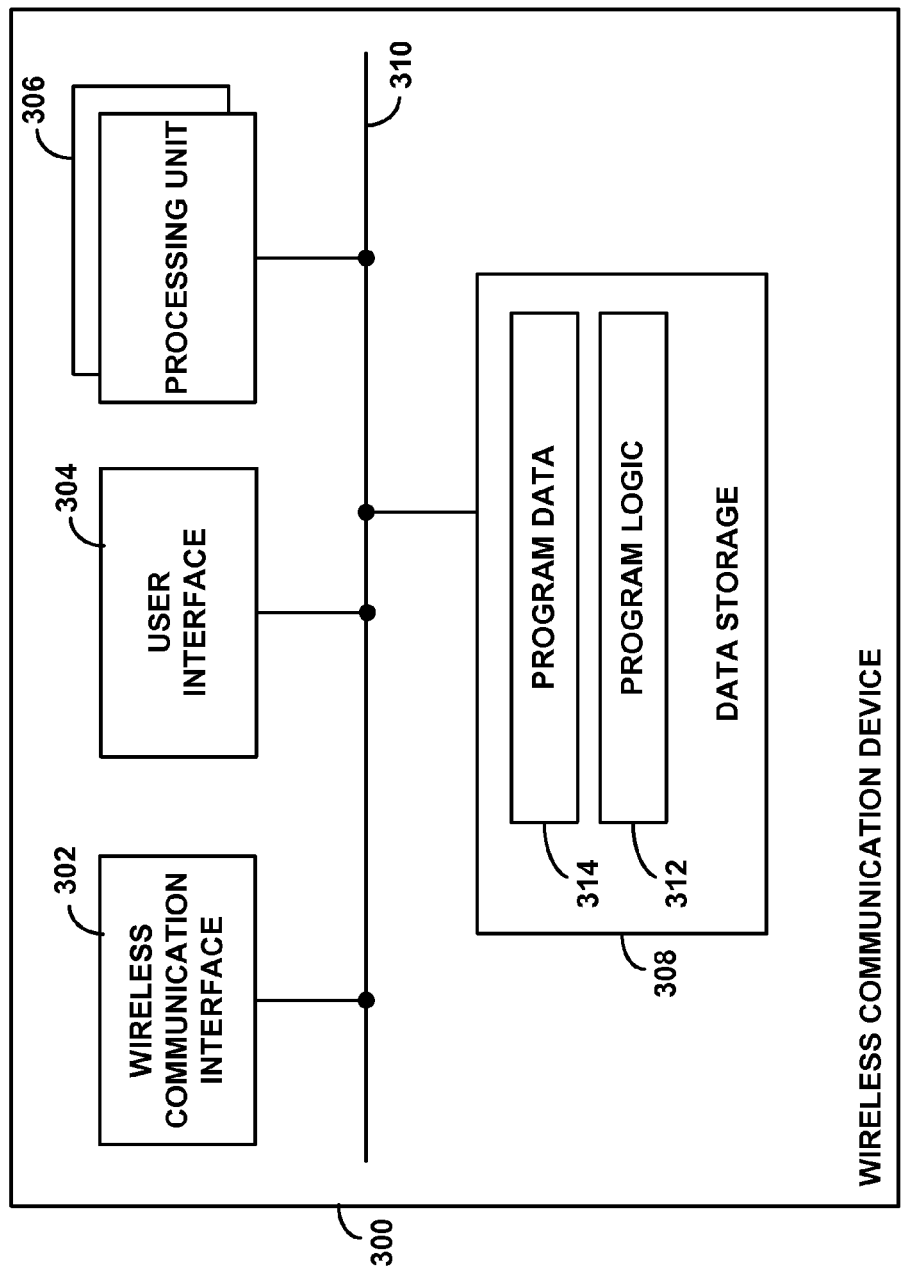
FIG. 3 is a simplified block diagram showing functional components that may be included in a WCD to facilitate implementation of the methods described herein.

FIG. 3 is a simplified block diagram showing functional components that may be included in an example WCD 300 to facilitate implementation of methods described elsewhere herein. Example WCD 300 may be representative of WCDs 16a-d depicted in FIG. 1, although these WCDs can take other forms as well. As illustrated, example WCD 300 includes a wireless communication interface 302, a user interface 304, a processing unit 306, and data storage 308, all of which may be communicatively linked together by a system bus, network, or other connection mechanism 310. Example WCD 300 may also include other components that are not shown.

Wireless communication interface 302 generally serves to allow WCD 300 to engage in wireless communication with a network, such as wireless carrier network 14, and in turn with entities via that network. Wireless communication interface 302 may take any suitable form to serve this purpose, examples of which include a chipset and antenna adapted to facilitate wireless communication, and/or any other interface that provides for wireless communication. Wireless communication interface 302 may also include multiple interfaces. Other configurations are possible as well.

User interface 304 may generally serve to enable a user to interact with WCD 300, and may thus comprise output components such as a display screen, an audio speaker, and the like, and input components such as a keyboard, camera, touch-pad or touch-screen, and the like. In practice, user interface 304 may facilitate a presentation to the user, and may function to receive from a user input of the type discussed above.

Processing unit 306 may comprise one or more processors, such as general-purpose processors (e.g., a microprocessor), special-purpose processors (e.g., an ASIC or DSP), programmable-logic devices (e.g., a FPGA), and/or any other processor components now known or later developed. Processing unit 306 may be integrated in whole or in part with other components of example WCD 300.

Data storage 308 may comprise one or more non-transitory computer readable mediums. For example, data storage 308 may take the form of one or more volatile and/or non-volatile storage components, such as magnetic, optical, or organic storage components, which may be integrated in whole or in part with other components of example WCD 300.

As further shown, data storage 308 may be arranged to include program logic 312 and/or program data 314. Program logic 312 may comprise machine language instructions or the like that may be executable or interpretable by processing unit 306 to carry out various functions, including the functionality described herein. In turn, program data 314 may include one or more types of data that is usable by processing unit 206 to carry out various functions including the functionality described herein.

Figure 4:
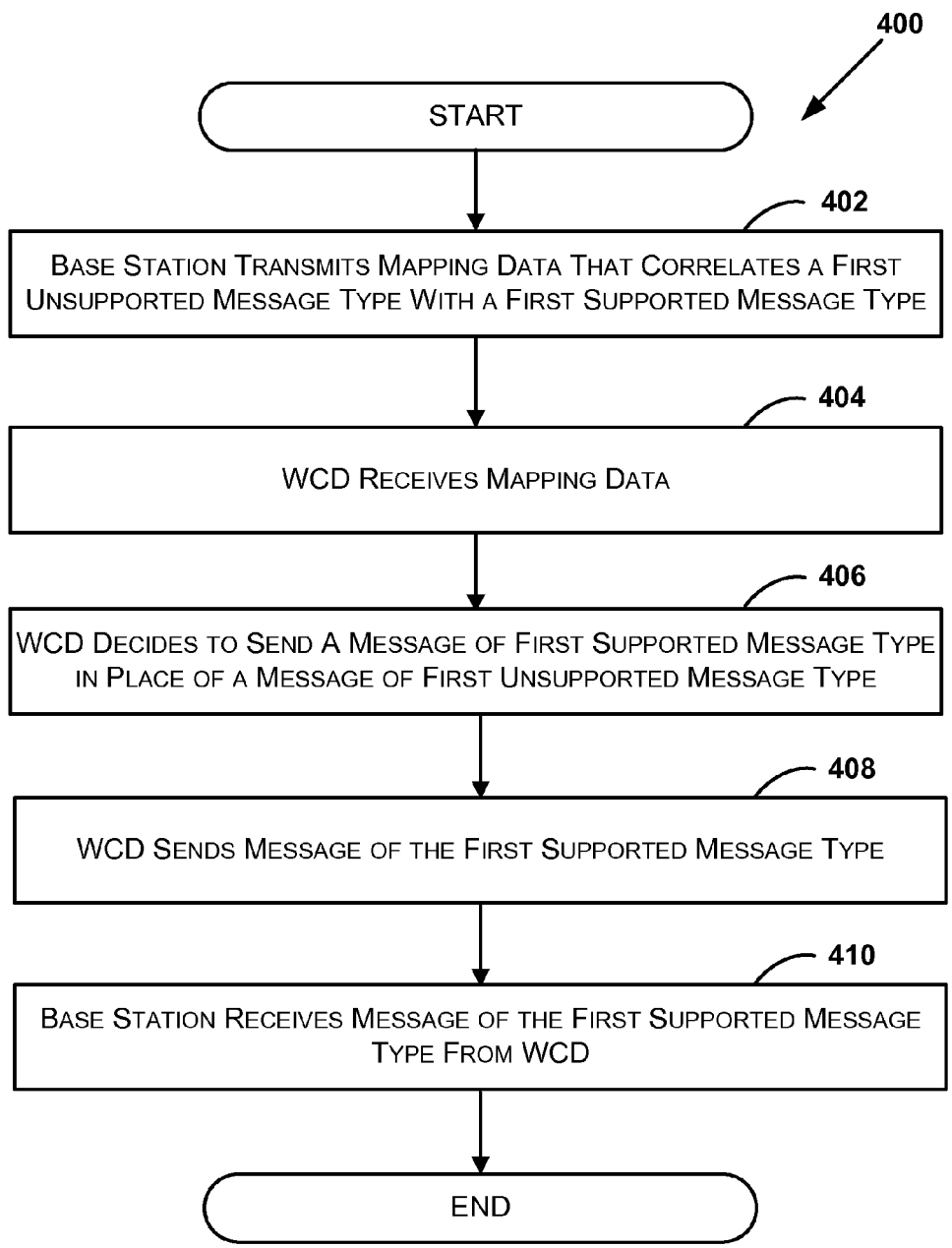
FIG. 4 is a flow chart depicting functions that may be carried out in accordance with embodiments of the disclosed methods.

FIG. 4 is a flow chart depicting functions that may be carried out in accordance with example embodiments described herein. For purposes of illustration, FIG. 4 is described in reference to communication between a representative base station (such as one of base stations 22a-b) and a representative WCD (such as one of WCDs 16a-d). However, the example embodiments may be carried out by any entity (or group of entities) configured to communicate directly or indirectly with one another.

As shown in FIG. 4, an example embodiment 400 may begin at block 402 with a base station transmitting, for receipt by one or more WCDs located in the base station's coverage area(s), mapping data that correlates at least a first unsupported message type with at least a first supported message type. While the features below are discussed in terms of the mapping data including a single unsupported message type that correlates to a single supported message type, it should be understood that (i) the mapping data may include multiple unsupported message types (e.g., a second unsupported message type) that each correlate to a respective supported message type (e.g., a second supported message type) and (ii) the mapping data may also include an unsupported message type that is correlated to multiple supported message types.

The first unsupported message type may be any message type that the base station does not or cannot support, and may take various forms depending on factors such as the type and/or manufacturer of the base station, the air-interface protocol employed, etc. In turn, the first supported message type that correlates to the unsupported message type may be any message type that the base station does support, and may also take various forms depending on factors such as the type and/or manufacturer of the base station, the air-interface protocol employed, etc. In practice, however, the first supported message type will preferably have functional similarities to the first unsupported message type (e.g., intended to accomplish a similar purpose), so that the second supported message type can serve as a reasonable substitute for the first unsupported message type. As one representative example, in the LTE protocol, the first unsupported message type may be a RRC connection reestablishment request message and the first supported message type may be a RRC connection request message. Various other examples are possible as well.

The mapping data may take a variety of forms. For example, the mapping data may include a pair of correlated indicators—one for the first unsupported message type and another for the first supported message type. As another example, the mapping data may be a representation of a table having a column with a plurality of unsupported message types and a corresponding column with a plurality of supported message types, which may take the form of a first set of indicators of unsupported message types and a second set of indicators of supported message types. Other examples are also possible. The indicators of the unsupported and supported message types may then take various forms, such as numerical, alphanumerical, and/or alphabetical indicators. For example, a message type indicator may be a full text name of the message type, an abbreviation or shorthand for the message type, etc.

In addition to the indicators of the unsupported and/or supported message types, the mapping data may also include other information. For example, in implementations where an unsupported message type is correlated with multiple supported message types, the mapping data may further include an indication of which of the multiple supported message types is the "preferred" supported message type for that unsupported message type. The mapping data may include other information as well.

The feature of the base station transmitting mapping data for receipt by the one or more WCDs can also take various forms. In one implementation, the base station may unicast the mapping data to a single WCD in response to various events. For example, the base station may unicast the mapping data to the single WCD when the WCD has entered a coverage area. In another example, the base station may detect that the single WCD is trying to connect (e.g., by sending an access probe and/or an RRC connection request message), and responsively unicast the mapping data to the single WCD. In yet another example, the base station may unicast the mapping data to the single WCD once the WCD has an active connection. Other examples are also possible.

According to this implementation, the base station may identify the WCD and then send the mapping data over a downlink channel for receipt by the identified WCD. The base station may also optionally continue to send the mapping data to the single WCD while the single WCD has an active connection. The frequency at which the mapping data is sent may be based on a schedule, one or more intermittent events, a change in the mapping data, etc. The downlink channel used to transmit the mapping data may vary based on factors such as the desired implementation and the air-interface protocol used to transmit the mapping data to the WCD. For example, in the LTE protocol, the base station may transmit mapping data in a master information block (MIB) and/or system information block (SIB) over the PDCCH. However, other examples are also possible.

In another implementation, the base station may multicast the mapping data to a group of WCDs in the coverage area. The group of WCDs may include, for example, all WCDs that are trying to connect to the network. The frequency at which the mapping data is sent to the WCDs may be based on a schedule or an event. For instance, the base station may send the mapping data in response to a new WCD entering the group of WCDs. The base station may send the mapping data using a variety of downlink channels. For example, in the LTE protocol, the downlink channel may be a PDCCH. However, other downlink channels are also possible.

In yet another implementation, the base station may broadcast the mapping data for receipt by any WCDs in the base station's coverage area(s). The base station may perform this broadcast according to a schedule or in response to some triggering event, and may send the mapping data using a variety of downlink channels. As one example, in the LTE protocol, the base station may broadcast the mapping data in a MIB and/or SIB over the PBCCH. However, other examples are also possible.

At block 404, a WCD that is located in the base station's coverage area(s) may receive from the base station the mapping data that correlates the first unsupported message type with the first supported message type. In response to receiving the mapping data, the WCD may then store this mapping data in data storage (which may involve modifying existing program data).

At block 406, based on the mapping data receiving from the base station, the WCD may then decide to send a message of the first supported message type in the place of a message of the first unsupported message type. This feature of the WCD deciding to send the message of the first supported message type in the place of the message of the first unsupported message type based on the mapping data may take various forms.

In one implementation, the WCD may use the mapping data to transition from (i) operating in a first mode in which the WCD may be configured to respond to a given event by sending an unsupported message type to the base station (which happens to be the WCD's default message type for responding to that event) to (ii) operating in a second mode in which the WCD may be configured to respond to the given event by sending the first supported message type to the base station in the place of the first unsupported message type. Thereafter, the WCD may then detect the given event, which may trigger the WCD to send the first supported message.

The given event that triggers the WCD to send the first unsupported message in the first mode and the first supported message in the second mode may take various forms. For example, the given event may be a user directive (e.g., a user instructing the WCD to obtain bearer data), or a message from the base station, or an event associated with the air-interface (e.g., a radio link failure). Additional examples are also possible.

The feature of the WCD transitioning from the first mode to the second mode may also take various forms. In one example, the WCD may perform the transitioning by modifying its program logic and/or program data (or employing other predefined program logic and/or program data) in a manner that alters the WCD's configured response to the given event. Other examples are also possible.

In another implementation, the WCD may first detect a given event for which the WCD is configured to respond by sending a given message type. In turn, the WCD may use the mapping data (i) to determine whether the given message type is the unsupported first message type, and (ii) if so, to select the first supported message type to send to the base station in the place of the given message type.

As noted above, in some situations, the mapping data may also include an unsupported message type that is correlated to multiple supported message types. For example, the first unsupported message type may be correlated to two different supported message types. In such situations, the feature of the WCD deciding to send the message of the first supported message type in the place of the message of the first unsupported message type may additionally involve the WCD deciding which of the supported message types to send in the place of the first unsupported message type. The WCD may base this decision on various factors, examples of which include additional information in the mapping data, the nature of the given event, the WCD's ability to send the supported message types, and/or a preconfigured selection algorithm.

In another situation, it is also possible that the WCD could be unable to send the first supported message type in the place of the first unsupported message type (e.g., due to the configuration of the WCD). In this situation, the WCD may be further configured to identify another message type, such as a second supported message type that is comparable to both the first unsupported message type and the first supported message, to send in the place of the first unsupported message type. Additional examples are also possible.

The feature of the WCD deciding to send the message of the first supported message type in the place of the message of the first unsupported message type based on the mapping data may take various other forms as well.

At block 408, after deciding to send the message of the first supported message type in the place of the message of the message of the first unsupported message type, the WCD may then send the message of the first supported message type to the base station. The WCD may use an uplink channel to send the supported message type to the base station. The uplink channel that is used may depend, for example, on the air-interface protocol, the type of message being sent to the base station, etc. For example, in an LTE protocol, the WCD may send a RRC reestablishment request message via a CCCH.

At block 410, the base station may then receive the message of the first supported message type from the WCD in the place of the message of the first unsupported message type. Thereafter, the base station may respond to the message or otherwise process the message. At some later time, the WCD may then stop using the base station's mapping data to decide which message types to send. This feature may be implementation in various manners. In one implementation, for instance, the WCD may stop using the base station's mapping data in response to detecting that the WCD is no longer operating in the base station's coverage area(s). According to this implementation, the WCD may transition back to a mode in which the WCD is configured to send any message type that it is capable of sending and continue operating in that mode until it receives mapping data from a new base station. In another implementation, the WCD may stop using the base station's mapping data in response to receiving mapping data from a new base station. According to this implementation, the WCD may simultaneously begin using the new base station's mapping data to decide which message types to send. And in either implementation, after the WCD stops using the base station's mapping data, the WCD can either discard that mapping data or maintain it for future reference. This feature may be implemented in other manners as well.

While some example embodiments have been described above, those of ordinary skill in the art will appreciate that numerous changes to the described embodiments could be made without departing from the scope and spirit of the claims.

What is claimed is:

1. A method comprising:
   a base station transmitting in a coverage area, for receipt by a given wireless communication device (WCD) prior to the WCD sending a message of a first unsupported message type to the base station, a mapping that correlates the first unsupported message type with a first supported message type; and
   as a result of transmitting the mapping, the base station receiving, from the given WCD, a message of the first supported message type in the place of the message of the first unsupported message type.

2. The method of claim 1, wherein the first unsupported message type is a radio resource control connection reestablishment request message type, and wherein the first supported message is a radio resource control connection request message type.

3. The method of claim 1, wherein transmitting the mapping comprises:
   broadcasting the mapping for receipt by WCDs in the coverage area of the base station.

4. The method of claim 1, wherein transmitting the mapping comprises:
   multicasting the mapping to a group of WCDs in the coverage area of the base station.

5. The method of claim 1, wherein transmitting the mapping comprises:
   unicasting the mapping to the given WCD.

6. The method of claim 1, wherein the base station transmits the mapping responsive to an indication that the given WCD is trying to connect to the base station.

7. The method of claim 1, wherein the base station transmits the mapping according to a schedule.

8. A base station comprising:
   a communication interface;
   a processor;
   data storage; and
   program instructions stored in data storage and executable by the processor for carrying out a set of functions, wherein the set of functions includes:
   transmitting, for receipt by a given wireless communication device (WCD) prior to the WCD sending a message of a first unsupported message type to the base station, a mapping that correlates the first unsupported message type with a first supported message type; and as a result of transmitting the mapping, receiving from the given WCD a message of the first supported message type in the place of the message of the first unsupported message type.

9. The base station of claim 8, wherein the first unsupported message type is a radio resource control connection reestablishment request message type, and wherein the first supported message is a radio resource control connection request message type.

10. The base station of claim 8, wherein the function of transmitting comprises:

broadcasting the mapping for receipt by WCDs in the coverage area of the base station.

11. The base station of claim 8, wherein the function of transmitting comprises:

multicasting the mapping to a group of WCDs in the coverage area of the base station.

12. The base station of claim 8, wherein the function of transmitting comprises:

unicasting the mapping to the given WCD.

13. The base station of claim 8, wherein the function of transmitting comprises: transmitting the mapping responsive to an indication that the given WCD is trying to connect to the base station.

14. The base station of claim 8, wherein the function of transmitting comprises:

transmitting the mapping according to a schedule.

15. A method comprising:

a wireless communication device (WCD) receiving, from a base station prior to the WCD sending a message of a first unsupported message type to the base station, a mapping that correlates the first unsupported message type with a first supported message type;

based on the mapping, the WCD deciding to send a message of the first supported type in the place of the message of the first unsupported type; and the WCD sending to the base station the message of the first supported type.

16. The method of claim 15, wherein deciding to send the message of the first supported message type in the place the message of the first unsupported message type based on the mapping comprises:

based on the mapping, transitioning to a mode in which the WCD is configured to respond to a given event by sending a message of the first supported message type in the place of a message of the first unsupported message type; and detecting the given event.

17. The method of claim 16, further comprising:

after detecting that it is no longer operating in a coverage area of the base station, the WCD transitioning back to a default mode in which the WCD is configured to respond to the given event by sending a message of the first unsupported message type.

18. The method of claim 15, wherein deciding to send the message of the first supported message type in the place of the message of the first unsupported message type based on the mapping comprises:

detecting a given event for which the WCD is configured to respond by sending a message of a given message type; and based on the mapping, determining that the given message type is the first unsupported message type and responsively selecting the first supported message type to send in the place of the given message type.

19. The method of claim 15, wherein the given event is a detected radio link failure.

20. The method of claim 15, wherein the first unsupported message type is a radio resource control connection reestablishment request message type, and wherein the first supported message is a radio resource control connection request message type.

* * * * *